US009203537B2

(12) United States Patent
Littlejohn et al.

(10) Patent No.: US 9,203,537 B2
(45) Date of Patent: Dec. 1, 2015

(54) MANAGING UNDER-FILLED SPOT BLOCKS

(71) Applicants: Jeffrey Lee Littlejohn, Alexandria, KY (US); David C. Jellison, Jr., Ogallala, NE (US)

(72) Inventors: Jeffrey Lee Littlejohn, Alexandria, KY (US); David C. Jellison, Jr., Ogallala, NE (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 425 days.

(21) Appl. No.: 13/731,265

(22) Filed: Dec. 31, 2012

(65) Prior Publication Data

US 2013/0137362 A1 May 30, 2013

Related U.S. Application Data

(63) Continuation of application No. 12/624,252, filed on Nov. 23, 2009, now Pat. No. 8,495,676.

(51) Int. Cl.

| | |
|---|---|
| ***H04N 7/10*** | (2006.01) |
| ***H04N 7/025*** | (2006.01) |
| ***H04H 60/25*** | (2008.01) |
| ***H04H 20/10*** | (2008.01) |

(52) U.S. Cl.

CPC ............. *H04H 60/25* (2013.01); *H04H 20/103* (2013.01)

(58) Field of Classification Search

CPC ............ H04N 21/812; H04N 21/4331; H04N 21/435; H04N 21/235; H04N 7/165; H04N 7/17318; H04N 7/10; H04N 7/16; H04N 5/44543; H04N 5/50; H04N 7/22; H04N 7/104; G06Q 30/02; G06Q 30/0241; G06Q 30/0277; G06Q 30/0251; G06Q 30/0269; G06Q 30/0242; G06Q 30/0272; G06Q 30/0201; G06Q 30/0246; G06Q 30/0243; H03H 7/482

USPC ......................... 725/32, 36; 705/14.45, 14.61

See application file for complete search history.

(56) References Cited

U.S. PATENT DOCUMENTS

| | | | | |
|---|---|---|---|---|
| 6,338,043 | B1 | 1/2002 | Miller | |
| 7,657,337 | B1 | 2/2010 | Evans et al. | |
| 7,853,969 | B2 | 12/2010 | Smith et al. | |
| 8,032,580 | B2 | 10/2011 | Slik | |
| 8,495,676 | B2 * | 7/2013 | Littlejohn et al. | 725/36 |
| 2006/0212348 | A1 | 9/2006 | Lambert et al. | |
| 2006/0287912 | A1 * | 12/2006 | Raghuvamshi | 705/14 |
| 2008/0189178 | A1 | 8/2008 | Schepers | |
| 2008/0189734 | A1 | 8/2008 | Schepers | |
| 2008/0282305 | A1 * | 11/2008 | Uhrig et al. | 725/114 |
| 2010/0017298 | A1 | 1/2010 | Stukenborg | |

(Continued)

*Primary Examiner* — Ngoc Vu

(74) *Attorney, Agent, or Firm* — Garlick & Markison; Edward J. Marshall

(57) ABSTRACT

Changes to spot blocks to be broadcast via terrestrial stations can cause paid spots to be removed from corresponding spot blocks on a streaming station. If the streaming station has other spot blocks that are under-filled, the bumped spots can be automatically placed in under-filled spot blocks, allowing the bumped to be placed in an under-filled spot block faster than if human intervention was required. A media traffic system can keep track of the bumped spots, and in response to a request by a media automation system, provide a list of potential spots available for inclusion in the under-filled spot blocks. The automation system selects desired spots for placement in under-filled spot blocks, and notifies the traffic system about which potential spots have been placed. The traffic system removes the spots from its list of available spots to prevent selected spots from being included in future responses.

20 Claims, 4 Drawing Sheets

(56) References Cited

U.S. PATENT DOCUMENTS

2010/0114715 A1 5/2010 Schuster
2010/0205049 A1* 8/2010 Long et al. .................. 705/14.5
2011/0029373 A1 2/2011 Steelberg et al.
2011/0087509 A1 4/2011 Schepers

* cited by examiner

MANAGING UNDER-FILLED SPOT BLOCKS

CROSS-REFERENCE TO RELATED APPLICATIONS

This application claims priority pursuant to 35 U.S.C. §120, as a continuation, to the following U.S. Utility Patent Application which is hereby incorporated herein by reference in its entirety and made part of the present U.S. Utility Patent Application for all purposes:

U.S. Utility application Ser. No. 12/624,252, entitled "MANAGING UNDER-FILLED SPOT BLOCKS," filed Nov. 23, 2009, pending.

FIELD

The present disclosure relates generally to spot blocks used to provide media advertisements, and more particularly to managing under-filled spot blocks.

BACKGROUND

Advertisements, commonly referred to as "spots," are often broadcast in blocks, referred to as "spot blocks." Such spot blocks may be scheduled during breaks between programming that is being broadcast to multiple different media outlets or stations. For example, a nationally syndicated program may be broadcast on various different local stations, in addition to being streamed over the Internet. In such cases, it can be desirable to have different advertisements played to different audiences. Different spots can be inserted in different spot blocks played during the same block of time, so a spot block broadcast over the air to a radio audience may include different spots than a spot block streamed to an Internet audience, even though the media program is the same.

Situations can arise in which a broadcast spot block needs to be modified. For example, one or more paid spots in a spot block following a program may need to be removed, or "bumped." If the same program is also being streamed over the Internet, one or more paid spots might also be bumped from the spot block being streamed.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a detailed description of embodiments of the disclosure depicted in the accompanying drawings. The embodiments are presented in sufficient detail to clearly communicate the disclosure to one of ordinary skill in the art. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
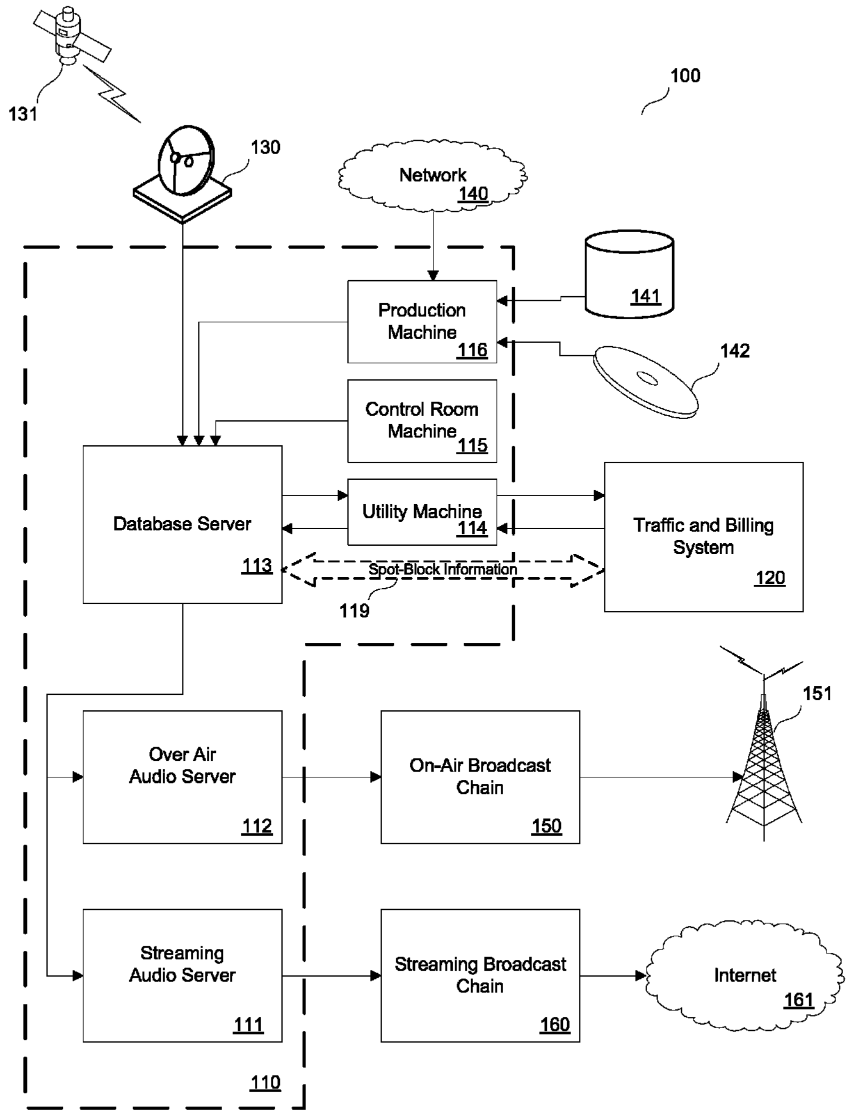
FIG. 1 is a block diagram illustrating a system according to various embodiments of the present disclosure.

Referring first to FIG. 1, a system 100 according to various embodiments of the present disclosure will be discussed. System 100 includes media automation system 110, which can be used to control and automate various media broadcast functions; and traffic and billing system 120, which is used to provide control for various traffic and billing functions such as entering and editing orders, and scheduling spots. System 100 also includes streaming broadcast chain 160, through which a streaming broadcast of media content can be provided to a network such as Internet 161, on air broadcast chain 150, through which media content can be broadcast via a broadcast tower 151, and various media sources such as an individual source media 142, bulk media storage 141, programming from another market and received via network 140, and programming broadcast via satellite 131, which can be received via satellite receiver 130.

Media automation system 110 includes production machine 116, which receives media content from network 140, bulk storage 141, individual source media 142; control room machine 115, and utility machine 114, each of which is connected to database server 113. Media automation system 110 also includes Over-Air audio server 112, which provides media content to on air broadcast chain 150; and streaming audio server 111, which provides audio content to streaming broadcast chain 160. Database server 113 can provide content to one or both of over-air audio server 112 and streaming audio server 111. In at least one embodiment, one or more of the illustrated servers can be implemented as virtual servers implemented on the same hardware as another of the illustrated servers. Furthermore, various distributed processing techniques can be used to spread functionality of one or more of the illustrated servers across multiple different machines.

In various embodiments, programming provided by streaming audio server 111 to streaming broadcast chain 116 is the same programming provided by over-air audio server 112 to on air broadcast chain 150. In many instances, however, particular spots included in the various spot blocks provided to on air broadcast chain 150 and streaming broadcast chain 160 can vary, even though the length and timing of the spot blocks themselves are generally consistent with each other.

In some embodiments, media automation system 110 can be, for example, a radio automation system used to control media content broadcast via multiple different radio stations in a single market, with some or all system elements and subsystems co-located in a single physical facility. In other embodiments, media automation system 110 can be a radio automation system used to provide control of radio stations in different markets, in different locations, or via different distribution channels. In an illustrated embodiment, media automation system 110 is used to control media broadcast over the air via on-air broadcast chain 150 and broadcast tower 151, and streaming media provided to the Internet 161 via streaming broadcast chain 160. Broadcast stations and delivery media in addition to those illustrated in FIG. 1 can also be controlled by media automation system 110. It should be appreciated that media automation system 110 can also be used with television and other types of media that may broadcast programming via multiple different stations or outlets.

Media automation system 110 can obtain media to be broadcast from various sources. For example, production machine 116 can obtain information from broadcasts in other markets via network 140. Production machine 116 can also obtain media from database 141, which may be a database local to production machine 116, or local to another server or machine that is part of media automation system 110. In other embodiments database 141 can be maintained by a third-party media provider, which can be remote from media automation system 110. Production machine 116 can also obtain media to be broadcast from individual media sources, such individual source media 142, which may include any of various non-volatile media storage elements, including but not limited to optical disks, e.g. compact discs (CDs), digital video disks (DVDs), various types of magnetic and electromagnetic storage media, or the like.

Production machine 116 can provide some or all of the media to be broadcast to database server 113. In addition to the media provided to database server 113 from production machine 116, satellite receiver 130 can also provide satellite content to be inserted into a broadcast via over-air audio server 112 and streaming audio server 111. Database server 113 can also receive media or other content to be broadcast from control room machine 115. Control room machine 115 may include a studio in which a live broadcast is being generated, such as a talk show or other similar live program, but control room machine 115 can also provide media to database server 113 other than live media.

Additionally, control room machine 115 can provide database server 113 with various control functions, and in some cases an operator can manually add or remove spots, programming, and other content that database server 113 has previously slotted for broadcast. Thus, for example, an operator in control room machine 115 may determine that a previously scheduled spot in a particular spot block is not to be broadcast for any of various reasons. Upon making that determination, control room machine 115 can be used to send a signal to database server 113. In response to the signal, database server 113 can remove the spot from its previously scheduled spot block. In some embodiments, the removed, or "bumped" spot by is not delivered to over-air audio server 112 for on air broadcast, nor is it delivered to streaming audio server 111 for streaming broadcast.

Traffic and billing system 120 is, in some embodiments, connected to database server 113 via a utility machine 114. In other embodiments, traffic and billing system may be connected to database server 113 through other machines, for example a control room machine 115, production machine 116, or directly connected to database server 113. In other embodiments, traffic and billing system 120 and database server 113 can be included in a single machine, or collection of machines that are co-located or connected in a distributed fashion. In any event, traffic and billing system 120 can communicate spot block information 119 to database server 113 and database server 113 can likewise communicate spot block information 119 back to traffic and billing system 120. In various embodiments, spot block information 119 can include requests for identification of potential spots available for inclusion in an under-filled spot block, responses to such requests, bumped spot notifications, broadcast logs and lists, spot files, parameters related to available, unavailable, and potential spots, spot block parameters, ranks, conditional information, various status information related to spots, and the like.

In general, traffic and billing system 120 can be used to provide control and monitoring of the sale and scheduling of spots, and to determine which spots are to be played on which stations at particular times. This information can be provided in the form of a log file in some embodiments. Media automation system 110 can use database server 113 to gather programming and media information from various sources, and combine that information with spot block information 119 to generate a log file indicating a substantially complete representation of which media and spots are to be broadcast. The log file and related information can be provided to both over-air audio server 112 and streaming audio server 111 for broadcast over their respective chains.

For example, programming provided from a satellite feed received through satellite receiver 130 will generally have breaks in its programming. The beginning and end of these breaks can be identified by dual-tone multi-frequency (DTMF) tones provided with the programming, or determined through various other means. Spot block information 119, can include the identity of various spots that are available to be played on particular stations during particular times, the priority of the spots in relationship to each other, and other similar information, which can be used to schedule spots into appropriate breaks in the programming.

In some instances, spots played over streaming broadcast chain 160 can be different than spots played over on-air broadcast chain 150, even though the programming and the breaks between various programming and media items are the same. Thus, a first spot block to be broadcast over on-air broadcast chain 150 by over-air audio server 112 may include three spots to be played from 10:00 AM to 10:03 AM on a particular date. A second spot block to be broadcast over streaming broadcast chain 160 may include two of the same spots included in the first spot block, with the third spot reserved for an advertisement targeted to an Internet audience.

Due to various circumstances, one or more spots, and in some cases entire spot blocks, may be removed from a particular spot block. Control room machine 115 can be used to notify database server 113 if a particular spot, or spot block, is to be the removed, if items are deemed not valid for airplay based on metadata entered by station staff or other individual, if an item is removed because it is missing audio, if an item is automatically skipped for administrative purposes, or otherwise. In some embodiments, such notification takes the form of a bumped-spot signal.

Because media broadcast stations generally derive revenue from broadcasting paid spots, any spots removed should be later reinserted into the media stream if possible, so that revenue for the paid spots is not lost. But because different spots can be included in corresponding spot blocks on different stations, or on the same station being broadcast over different chains, reinserting bumped spots can require a close coordination between the media automation system and the media traffic system. Some spots, whether paid or not, may have a higher priority than other similar spots, and are generally referred to herein as "priority spots." In some cases it is desirable to reinsert priority spots that have been removed from the media stream.

Close coordination can also be important to make sure that various scheduling and marketing parameters associated with reinserted priority spots are satisfied. In at least one embodiment, traffic and billing system 120 can maintain information regarding scheduled spots that should be played either at certain times of day, on certain days of the week, spots that should be played in conjunction with various other spots, spots having priority over other spots with the same or similar parameters, or spots whose placement in a spot block or is otherwise constrained.

In some instances, particularly with regards to a streaming broadcast chain 160 provided through streaming audio server 111, some of the spot blocks scheduled for play later in the day, may be under-filled, meaning that a sufficient number of spots have not yet been scheduled to fill the time allotted for a break between, or within, various different media programs.

In some cases, if priority spots, e.g. paid advertisements, meeting the requirements of a particular under-filled spot block are not available, media automation system 110 will insert unpaid or lower priority filler, e.g. a public service announcement, into the available space. However, if one or more of the previously bumped priority spots meet the criteria necessary for being broadcast in the under-filled spot block, those priority spots can be inserted into the under-filled spot block to allow media automation system 110 to recover revenue that may otherwise have been lost.

To make these previously bumped spots available for inclusion in under-filled spot blocks, database server 113 can provide information to traffic and billing system 120 related to spots that have been removed. Traffic and billing system 120 can collect and store information about bumped spots that may be available for future inclusion in under-filled spot blocks. Over-Air audio server 112 or streaming audio server 111 can notify database server 113 of under-filled spot blocks, and request database server 113 to provide content to be included in those under-filled spot blocks. Database server 113 can, in turn, request traffic and billing system 120 to search through its collection of available priority spots to identify potential spots that are available for inclusion in the under-filled spot block. Traffic and billing system 120 can return the requested information to database server 113, which will in some embodiments select which of the potential spots to be included in the under-filled spot block. Database server 113 can provide the spot to the appropriate server for broadcast, and send a message back to traffic and billing system 120 indicating which of the potential spots were chosen for inclusion in the under-filled spot block. Traffic and billing system 120 can then update its list of available spots to indicate that a selected spot has already been rescheduled for broadcast in the under-filled spot block.

In some embodiments, filling under-filled spot blocks is performed automatically, and on a time scale that can be impractical if human intervention or decision making is required. Thus, for example, an under-filled spot block in the following minutes can be filled with a spot bumped during the previous minutes. In some cases, a bumped spot can be placed in the next spot block playing on the same station if, for example, the next spot block includes unpaid filler, lower priority spots, or under other circumstances as desired.

It will be appreciated that various systems can be used to implement the teachings set forth herein, and are not limited to the systems discussed with reference to FIG. 1. For example, although at least one embodiment includes separate traffic and billing systems, similar functionality can be provided using a single, integrated or system having one or more local or distributed processing, storage and communication elements. Thus, although embodiments including automation and traffic systems are primarily discussed herein, other embodiments can be implemented without the need for cooperation between separate automation and traffic systems.

Figure 2:
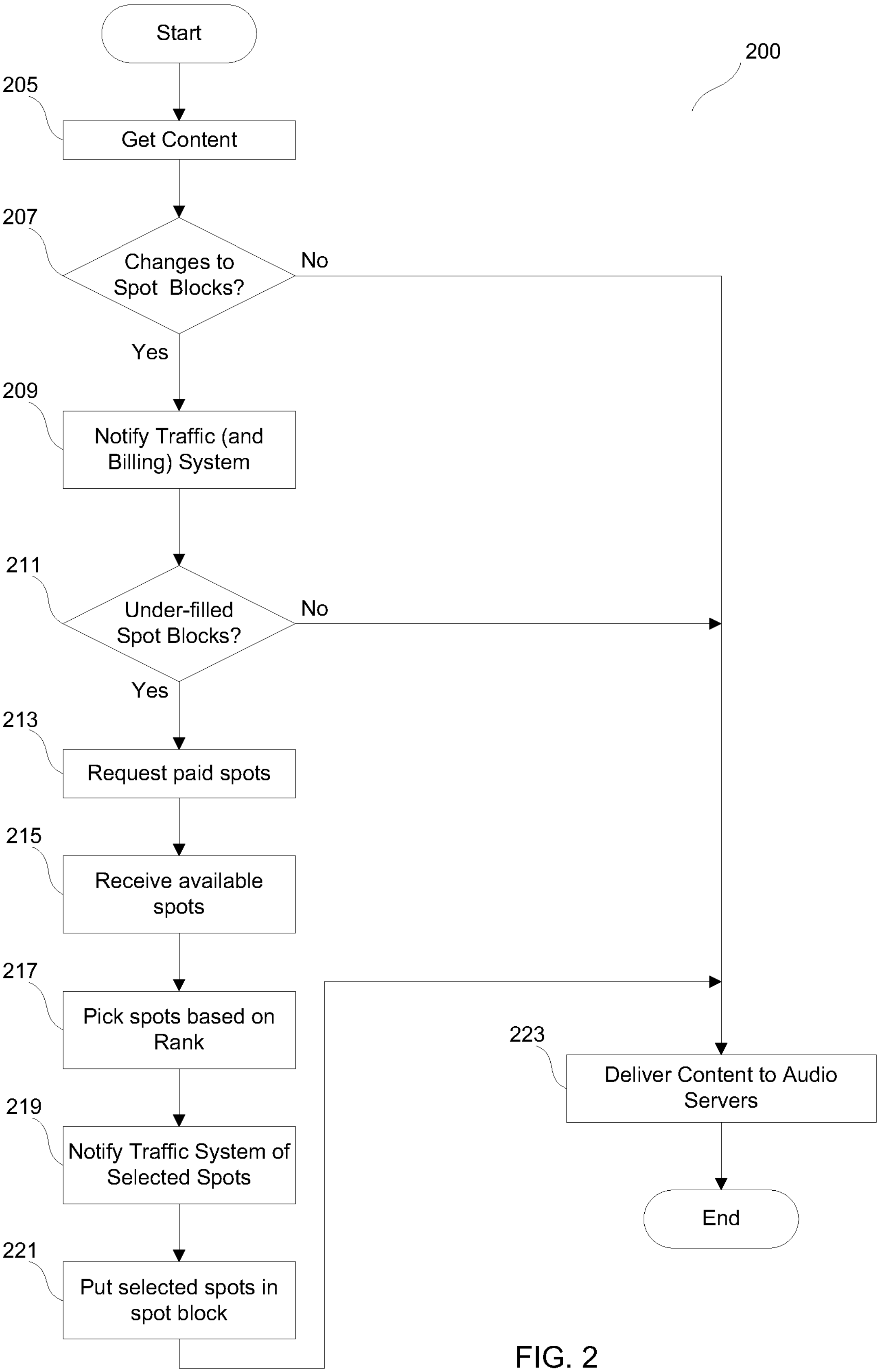
FIG. 2 is a flow chart illustrating a method for use in a media automation system according to various embodiments of the present disclosure.

Referring next to FIG. 2, a method 200 for use in a media automation system according to various embodiments of the present disclosure is discussed. As illustrated by block 205, media automation system receives content from various sources, which can include media items and programming, paid and unpaid spots, live content, or other content to be broadcast via any of various distribution channels. As illustrated by block 207, media automation system may make changes to spot blocks as a result of manual or automated input from any of various sources. These changes can include removal of one or more spots from one or more spot blocks, or removal of an entire spot block.

As illustrated by block 209, a media automation system can notify the traffic and billing system of changes that were made to the spot blocks. In at least one embodiment, both paid and unpaid spots bumped by the media automation system are reported to the traffic and billing system using a bumped-spot signal, while in other embodiments only paid spots are reported. The traffic and billing system can keep track of any bumped spots by flagging or otherwise marking the spots to indicate their availability for inclusion in other spot blocks. Other circumstances in which a bumped-spot signal may be sent to the traffic and billing system include, but are not limited to, items being deemed not valid for airplay based on metadata entered by station staff or another individual, an item being removed because of missing audio, and cases where items are automatically skipped for administrative purposes.

As illustrated by block 211, the media automation system can determine whether there are any under-filled spot blocks that might require additional priority spots to fill them. The determination can be made by a subsystem of the media automation system, or by an external system that reports information to the media automation system. Thus for example a streaming audio server, which may be of the same media automation system as a database server, can notify the database server that additional spots are required to fill currently under-filled spot blocks. In other embodiments, a system not under control of the media automation system can send a message to the media automation system notifying the system that additional spots can be accommodated.

As illustrated by block 213 media automation system can request priority spots from a traffic or traffic and billing system for inclusion in one or more under-filled spot blocks. In some embodiments, the request for priority spots can also include various parameters an acceptable spot must meet for inclusion in the spot block in question. Thus, for example, a request for additional priority spots for an under-filled spot block may indicate a start and a stop time of the spot block, a station identifier, a date on which the spot block is to air, the length of the spot block to be filled, and a spot block identifier. Other spot block parameters can be provided in conjunction with, or as part of, the request sent from the automation system to the traffic system if desired. An example of parameters that may be provided in conjunction with the request for priority spots include various requirements for types of spot block content, including, an industry associated with the spot block, spots that may be required or prohibited to be played in a particular spot block, or the like.

As illustrated at block 215, the media automation system can receive a log, list, or other indication of potential spots available for inclusion in a particular spot block from the traffic and billing system. In some such embodiments, the spots are pre-ranked by the traffic and billing system, based on a spot rate, a campaign identifier or another suitable parameter. In other embodiments, information useful in ranking the particular spots is provided to the media automation system from the traffic and billing system so that the media automation system itself can rank the spots if desired.

As illustrated by block 217, the media automation system can choose spots to include in particular spot blocks based on a spot's rank, with spots having a higher rank being selected for inclusion in favor of spots having a lower rank. A spot's rank may be based on its rate, which can facilitate selection of spots providing greater revenue. In other embodiments, selecting spots based on rank can allow preferred spots to be selected based on a campaign with which the spot is associated, or otherwise.

As illustrated by block 219, the media automation system can notify the traffic and billing system regarding which spots the media automation system has selected for inclusion in particular spot blocks using a consumed-spot signal. In some embodiments, information regarding the spot block for which a spot was selected for placement is included in a message to the traffic and billing system. In other embodiments, the traffic and billing system is notified of the fact of selection without reference to a particular spot block. Various combinations of information can be sent from the automation system to the traffic system in the consumed-spot signal to achieve various goals consistent with the teaching set forth herein.

As illustrated by block 221, a media automation system inserts the selected spots into the under-filled spot blocks, and as illustrated by block 223, delivers content to the media servers. Also as illustrated by block 223, if no changes to the spot blocks have been made, the content delivered to the audio servers can include the originally scheduled spot blocks. If there were no under-filled spot blocks, or if none of the potential spots provided to the automation system are usable, the content as originally scheduled can be provided to the media servers for further delivery to their respective audiences.

It will be appreciated that additional actions can be performed as part of method 200 without departing from its spirit and scope. For example, in the event that no usable priority spots are available, unpaid fill can be inserted into an under-filled spot block prior to delivering the media content to the respective media servers as shown in block 223.

Figure 3:
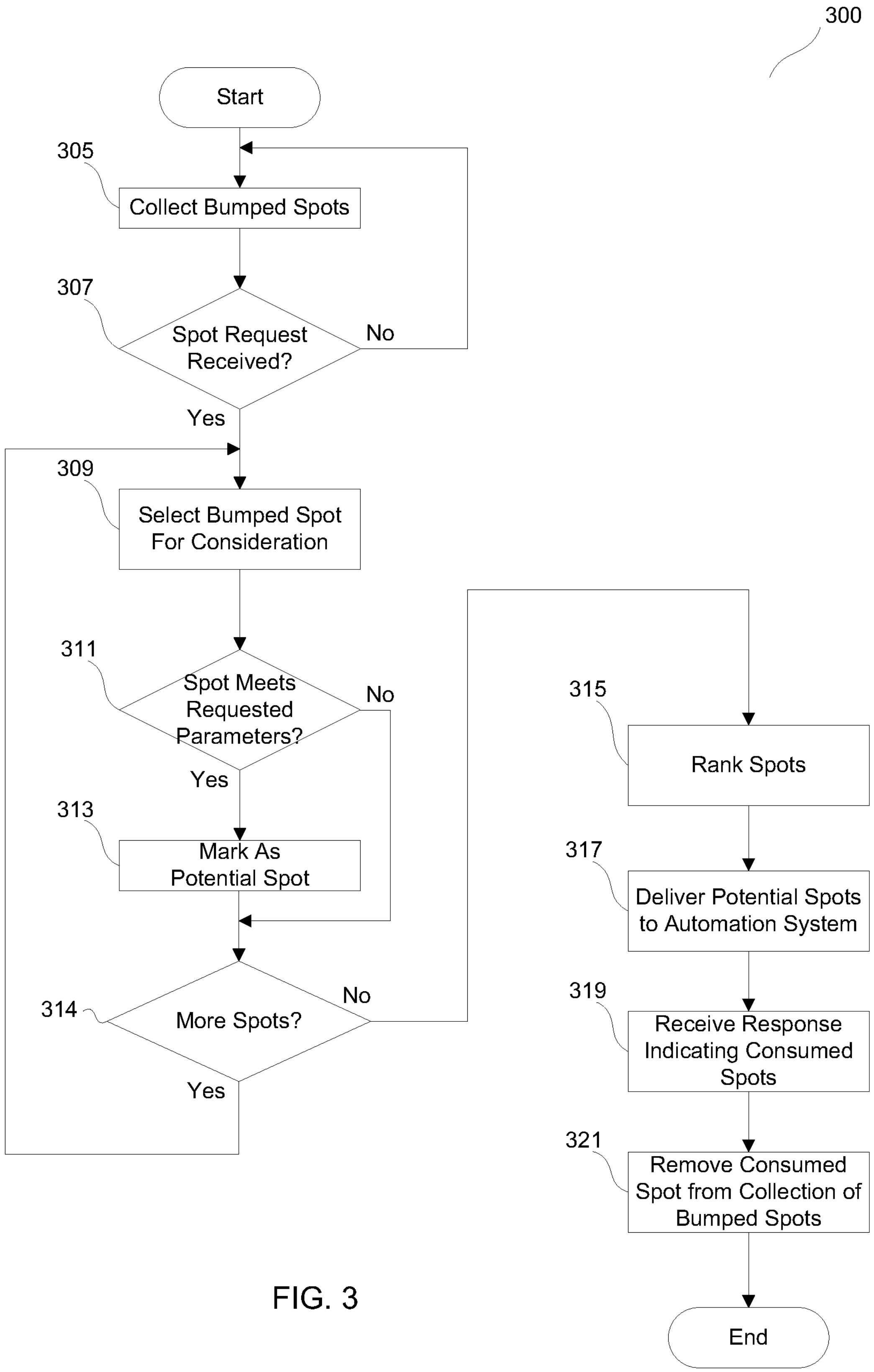
FIG. 3 is a flowchart illustrating a method for use in a media traffic system according to various embodiments of the present disclosure.

Referring next to FIG. 3 a method 300 for use in a media traffic system according to various embodiments of the present disclosure will be discussed. Method 300 begins as illustrated at block 305 with a media traffic system collecting bumped spots. In some embodiments, the bumped spots may be literally collected by storing the bumped spots as files in a single physical location. Collection of bumped spots can also be performed by storing a collection of pointers to the bumped spots. In yet other embodiments, the bumped spots can be collected by storing a list, table, or other collection of identifiers associated with bumped spots. In at least some embodiments, collecting bumped spots includes marking, flagging, or otherwise identifying particular bumped spots as available for use, or indicating that particular bumped spots have already been selected for inclusion in a spot block.

As illustrated by block 307, a media traffic system can periodically, aperiodically, or otherwise check to see if a request for available potential spots has been received from a media automation system or otherwise. If no request has been received method 300 continues to collect bumped spots and check for requests.

As illustrated by block 309, in response to a request for potential spots, a media traffic system can begin selecting spots to respond to the automation system's request by choosing a particular bumped spot for consideration. As illustrated by block 311, characteristics of the bumped spot chosen for consideration can be compared to spot block or other parameters to determine whether the spot meets the criteria specified in the received request. In at least some embodiments, the parameters can include a parameter indicating the spot's rate, a start and end time of the spot block, space available to be filled within the spot block, a spot block identifier, other spots currently scheduled to play within the spot block, or the like.

As illustrated by block 313, if a bumped spot chosen for consideration satisfies the parameters supplied in conjunction with the received request, the spot can be marked as a potential spot, for future delivery to a media automation system. As illustrated by block 314 a check can be made to determine if there are more spots yet to be considered. If there are, method 300 returns to block 309 and chooses another bumped spot for consideration. This process can continue iteratively until a designated number of potential spots is identified, until there are no more spots to be considered, or until another stop condition is encountered.

As illustrated by block 315, media traffic system can rank the potential spots prior to delivering them to a media automation system. The spots can be ranked based on the parameters provided in conjunction with the request, or in some embodiments based on an advertising or other rate associated with the spot. In some such embodiments, all potential spots in the collection of bumped spots can be ranked so that the spot with the highest rate has the highest rank, while the spot with the lowest rate has the lowest rank. Ties in ranking based on the rate can be handled by making one or more of the parameters received with the request a tie-breaking consideration, or all spots having the same rate can be considered to have the same rank. Thus, in some embodiments it is possible that all potential spots identified by a media traffic and billing system will have the same rank. In such a case, the potential spots can be ordered alphabetically, using a first-in-first-out (FIFO) process, or using another desired sorting mechanism.

As illustrated by block 317, potential spots can be delivered to the media automation system. Delivery of the spots to the automation system may include delivery of the log, delivery of physical media files, delivery of the list, delivery of pointers, or delivery of other information that will allow media automation system to obtain the identified spots. In at least one embodiment, a log file including identifiers is delivered to the media automation system.

As illustrated by block 319, at some point after delivering the potential spots to an automation system, a response can be received at the traffic system indicating which of the potential spots have been chosen by the automation system for inclusion in under-filled spot blocks. The notification may include a change log, a list, pointers, or any other suitable mechanism to identify the potential spots actually consumed.

As illustrated by block 321, in response to receiving an indication of the consumed spots, the identified spots can be removed from the collection of bumped spots. Removal from the collection of bumped spots may include actual physical removal the file, changing of the pointer, setting or resetting a flag, or performing some other action allowing the media traffic system to identify which of the collected bumped spots are no longer available, and should not be provided in response to future spot requests.

Figure 4:
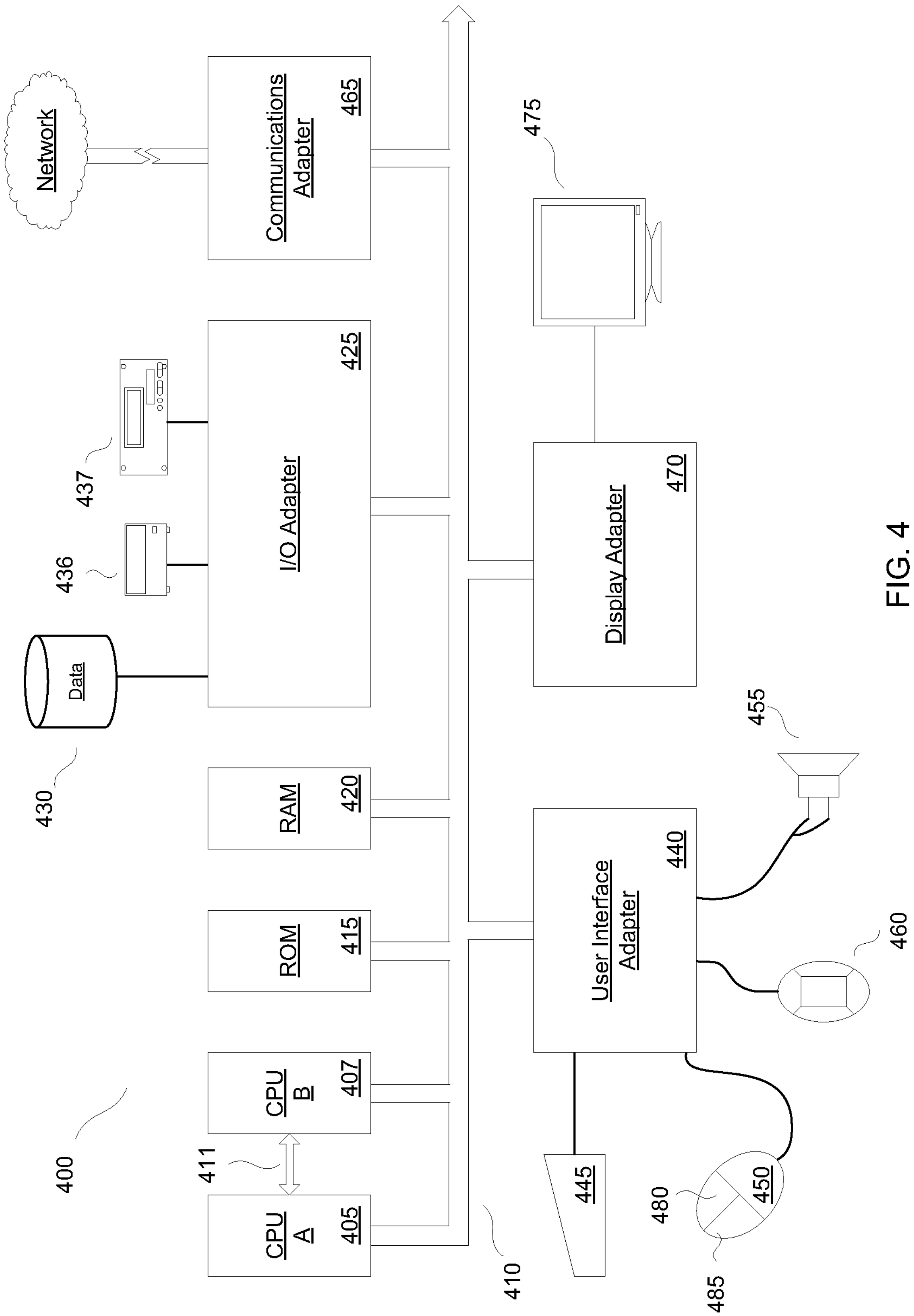
FIG. 4 is a high level block diagram of a processing system according to an embodiment of the present disclosure.

Referring now to FIG. 4, a high-level block diagram of a processing system is illustrated and discussed. Processing system 400 includes one or more central processing units, such as CPU A 405 and CPU B 407, which may be conventional microprocessors interconnected with various other units via at least one system bus 410. CPU A 405 and CPU B 407 may be separate cores of an individual, multi-core processor, or individual processors connected via a specialized bus 411. In some embodiments, CPU A 405 or CPU B 407 may be a specialized processor, such as a graphics processor, other co-processor, or the like.

Processing system 400 includes random access memory (RAM) 420; read-only memory (ROM) 415, wherein the ROM 415 could also be erasable programmable read-only memory (EPROM) or electrically erasable programmable read-only memory (EEPROM); and input/output (I/O) adapter 425, for connecting peripheral devices such as disk units 430, optical drive 436, or tape drive 437 to system bus 410; a user interface adapter 440 for connecting keyboard 445, mouse 450, speaker 455, microphone 460, or other user interface devices to system bus 410; communications adapter 465 for connecting processing system 400 to an information network such as the Internet or any of various local area networks, wide area networks, telephone networks, or the like; and display adapter 470 for connecting system bus 410 to a display device such as monitor 475. Mouse 450 has a series of buttons 480, 485 and may be used to control a cursor shown on monitor 475.

It will be understood that processing system 400 may include other suitable data processing systems without departing from the scope of the present disclosure. For example, processing system 400 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments have been described for providing spots to be included in under-filled spot blocks. Other variations and modifications of the embodiments disclosed may be made based on the description provided, without departing from the scope of the invention as set forth in the following claims.

What is claimed is:

1. A method comprising:

removing, at a media automation system, a bumped spot from a spot block;

in response to the removing, sending a bumped-spot signal from the media automation system to a media traffic system indicating the bumped spot is removed from the spot block;

identifying, at the media automation system, an under-filled spot block;

in response to identifying an under-filled spot block, selecting the bumped spot for inclusion in the under-filled spot block; and sending a consumed-spot signal from the media automation system to the media traffic system indicating the bumped spot is selected for inclusion.

2. The method of claim 1, comprising:

removing, at the media automation system, a plurality of bumped spots from at least one spot block;

in response to identifying the under-filled spot block, sending a request from the media automation system to a media traffic system requesting a bumped spot available for inclusion in the under-filled spot block;

receiving, at the media automation system, a response from the media traffic system identifying the plurality of bumped spots as available potential spots; and selecting at least one of the plurality of bumped spots for inclusion in the under-filled spot block.

3. The method of claim 2, the request further comprises at least one parameter associated with the under-filled spot block.

4. The method of claim 3, the at least one parameter is selected from the group of spot-block parameters consisting of: start time, end time, station identifier, date, length to fill, and spot-block identifier.

5. The method of claim 2, selecting at least one of the plurality of bumped spots is based at least in part on a corresponding priority of the at least one of the plurality of bumped spots.

6. The method of claim 5, the response includes an indication of a corresponding priority of each of the plurality of bumped spots.

7. The method of claim 5, wherein:

the response includes information associated with each of the plurality of bumped spots; and selecting at least one of the plurality of bumped spots for inclusion in the under-filled spot block includes determining, at the media automation system, a corresponding priority for each of the plurality of bumped spots based on the information.

8. A method comprising:

receiving a bumped-spot signal from a media automation system, the bumped-spot signal indicating a bumped spot is removed from a spot block;

receiving a request from the media automation system requesting spots available for inclusion in an under-filled spot block;

identifying the bumped spot from a plurality of spots as at least one available spot; and sending a response to the media automation system indicating the bumped spot as at least one spot available for inclusion in the under-filled spot block.

9. The method of claim 8, wherein the request received from the media automation system further comprises at least one parameter associated with the under-filled spot block; and the bumped spot is identified as at least one available spot based on the at least one parameter.

10. The method of claim 8, wherein the bumped spot is identified as at least one available priority spot based on the bumped spot having been removed from a spot block.

11. The method of claim 9, the at least one parameter is selected from the group of spot-block parameters consisting of: start time, end time, station identifier, date, length to fill, and spot block identifier.

12. The method of claim 8, further comprising:

receiving a bumped-spot signal from a media automation system, the bumped-spot signal indicating a plurality of bumped spots are removed from at least one spot block;

identifying the plurality of bumped spots as available for inclusion in the under-filled spot-block;

determining a corresponding priority of each of the plurality of bumped spots; and selecting at least one of the plurality of bumped spots for inclusion in the under-filled spot block based on a corresponding priority of the at least one of the plurality of bumped spots.

13. The method of claim 12, the corresponding priority for each bumped spot is determined based on whether the bumped spot is a paid spot.

14. A system comprising:

a media automation system comprising:

a first server configured to receive media content from a plurality of different media sources;

a second server communicatively coupled to the first server and configured to provide media content to an on-air broadcast chain;

a third server communicatively coupled to the first server and configured to provide media content to a streaming broadcast chain; and a media traffic system communicatively coupled to the first server of the media automation system, the media traffic system configured to transmit to the first server, bumped spots previously removed from a first spot block that are available for inclusion in a second spot block, wherein the bumped spots are specifically identified spots selected for removal from one or more particular spot blocks.

15. The system of claim 14, the first server is further configured to:

send a request to the media traffic system requesting a potential spot available for inclusion in the second spot block, the second spot block is an under-filled spot block.

16. The system of claim 15, wherein the request comprises at least one parameter associated with the under-filled spot-block.

17. The system of claim 16, the at least one parameter is selected from the group of spot-block parameters consisting of: start time, end time, station identifier, date, length to fill, and spot-block identifier.

18. The system of claim 14, wherein:

the first spot block is associated with the second server; and the second spot block is associated with the third server.

19. The system of claim 18, the media traffic system is further configured to:

rank the bumped spots available for inclusion in the second spot-block, the second spot block is an under-filled spot block; and transmit, to the first server, an indication of the rank of the bumped spots.

20. The system of claim 19, wherein the first server is further configured to:

receive the bumped spots available for inclusion in the under-filled spot block and the indication of the rank of the bumped spots;

select at least one of the bumped spots for inclusion in the under-filled spot-block; and transmit, to the media traffic system, an indication of which at least one of the bumped spots the media automation system selected for inclusion in the under-filled spot-block.

* * * * *